(12) United States Patent
Meinert et al.

(10) Patent No.: US 12,716,836 B2
(45) Date of Patent: Aug. 25, 2026

(54) MEASURING ARRANGEMENTS AND METHODS FOR THE DETECTION OF TRACE GASES IN A SAMPLE GAS

(71) Applicant: Endress+Hauser Group Services AG, Reinach (CH)

(72) Inventors: Tobias Meinert, Freiburg (DE); Benjamin Scherer, Oberried (DE); Ulrich Hoefer, Freiburg (DE)

(73) Assignee: Endress+Hauser Group Services AG, Reinach (CH)

( * ) Notice: Subject to any disclaimer, the term of this patent is extended or adjusted under 35 U.S.C. 154(b) by 81 days.

(21) Appl. No.: 18/989,983

(22) Filed: Dec. 20, 2024

(65) Prior Publication Data

US 2025/0208038 A1 Jun. 26, 2025

(30) Foreign Application Priority Data

Dec. 20, 2023 (DE) ..................... 10 2023 136 103.1

(51) Int. Cl.

*G01N 21/45* (2006.01)
*G01N 21/01* (2006.01)
*G01N 21/31* (2006.01)
*G01N 21/17* (2006.01)

(52) U.S. Cl.

CPC ............ *G01N 21/45* (2013.01); *G01N 21/01* (2013.01); *G01N 21/31* (2013.01); *G01N 2021/0137* (2013.01); *G01N 2021/1748* (2013.01); *G01N 2021/3125* (2013.01); *G01N 2021/451* (2013.01)

(58) Field of Classification Search

CPC ........ G01N 21/45; G01N 21/01; G01N 21/31; G01N 2021/0137; G01N 2021/1748; G01N 2021/3125; G01N 2021/451; G01N 21/171

See application file for complete search history.

(56) References Cited

U.S. PATENT DOCUMENTS

2007/0246653 A1 10/2007 Zhou
2013/0250301 A1 9/2013 Feitisch et al.
2019/0195781 A1* 6/2019 Waclawek ......... G01N 21/4133

FOREIGN PATENT DOCUMENTS

DE 102009010797 A1 9/2010
EP 1070956 A1 1/2001
WO 2018009953 A1 1/2018

* cited by examiner

*Primary Examiner* — Tony Ko
(74) *Attorney, Agent, or Firm* — Gil M. Repa; Endress+Hauser (USA) Holding, Inc.

(57) ABSTRACT

A measuring arrangement for detecting trace gases in a sample gas, the measuring arrangement includes at least one narrow-band excitation light source; first and second chambers, wherein the excitation light is emitted into the chambers; a scrubber, wherein trace gases are removed from the sample gas as it passes between the first and second chambers; at least one narrow-band measurement light source arranged such that the measurement light hits the excitation light in the first chamber and second chambers; a detector unit which is in optical contact with the first and second chambers and detects the measurement light from the first and second chambers and converts it into a first and a second electrical signal; and a data processing unit which calculates the amount of trace gases in the sample gas from the first and second electrical signals. The present disclosure also discloses an alternative measuring arrangement and method.

17 Claims, 4 Drawing Sheets

MEASURING ARRANGEMENTS AND METHODS FOR THE DETECTION OF TRACE GASES IN A SAMPLE GAS

CROSS-REFERENCE TO RELATED APPLICATION

The present application is related to and claims the priority benefit of German Patent Application No. 10 2023 136 103.1, filed on Dec. 20, 2023, the entire contents of which are incorporated herein by reference.

TECHNICAL FIELD

The present disclosure relates to measuring arrangements and methods for the detection of trace gases in a sample gas.

BACKGROUND

The problem underlying the present disclosure will be explained without loss of generality with reference to the measurement of $H_2S$ in natural gas.

The spectroscopic measurement of trace gases such as $H_2S$ in a sample gas such as natural gas or biogas is difficult because the absorption of other gases in the gas mixture is higher by at least 2 orders of magnitude. There are in fact wavelength ranges in which the concentration-normalized absorption lines of $H_2S$ are larger than those of methane. Since however the $H_2S$ concentration in natural gas and processed biogas must be less than 4 ppm but the methane content is 50%-99%, the absorption of methane in the wave number range of 1000-6500 $cm^{-1}$ is almost universally greater by a factor of 100 or more than the absorption of $H_2S$. This means that fluctuations in methane concentration can cause a large error in a $H_2S$ measurement.

To avoid this, a differential TDLAS (tunable diode laser absorption spectroscopy) measurement is carried out, for example, in the commercially available product "Gas analyzer SS2100" from the Endress+Hauser Group. For this purpose, a reference measurement is carried out at regular intervals. For this purpose, the gas mixture is passed through a "scrubber" which removes $H_2S$ from the gas mixture. In this way, the background spectrum can be recorded without the $H_2S$ component. This background spectrum is eliminated from the subsequent measurement with $H_2S$.

The disadvantage of this method with differential measurement is the dead time of several minutes that occurs while the background spectrum is being recorded. In addition, TDLAS requires a long-path cell to detect the low absorptions of $H_2S$. Such long-path cells have a large volume of about 3 L. The large volume has two disadvantages: firstly, it leads to a long response time and secondly, the large volume means a large gas loss in an extractive measurement.

Another method for measuring trace gases is photothermal spectroscopy. It is known in this regard that the absorption of photons leads to an excitation of molecular energy levels, which in turn can lead to a change in the temperature, pressure and density of the sample. The temperature change occurs when the molecule relaxes from the excited energy level back to the original energy level through a non-radiative transition. The changes in these properties can be used to detect trace gases in photothermal spectroscopy (PTS). This method uses laser radiation to produce transient changes in sample properties. The temperature increase caused by photoabsorption creates a pressure change within the sample, which propagates in an acoustic wave. Once the pressure has relaxed to the equilibrium pressure, a change in density proportional to the temperature remains.

In combination, temperature and density changes affect other properties of the sample, such as the refractive index. PTS methods involve changes in sample temperature, which are usually monitored via the refractive index of the sample. In contrast to classical transmission spectroscopy according to the Lambert-Beer law, in which the sensitivity increases with path length, PTS is an indirect method for optical absorption analysis in which a photoinduced change in the thermal state of the sample is measured. The emitted heat output is proportional to the absorption coefficient of the sample and the incident light intensity.

PTS arrangements for detecting refractive index changes typically use an excitation laser for sample heating and another laser to monitor the changes resulting from the heating. The change in the refractive index causes a phase shift of the light that passes through the heated sample and can be measured with high sensitivity using an interferometer.

The use of Fabry-Pérot interferometers (FPI) for the photothermal detection of trace gases is known, for example, from WO 2018/009953.

Differential measurements are also known from photothermy. However, the measuring principle described in WO 2018/009953 does not serve to compensate for background absorption, but rather to compensate for background noise and laser noise.

The present disclosure is based on the object of compensating for the background spectrum in photothermal spectroscopy.

SUMMARY

The object is achieved by a measuring arrangement for detecting trace gases in a sample gas, the measuring arrangement comprising at least one, in particular narrow-band, excitation light source for emitting excitation light; a first chamber with an inlet for the sample gas and an outlet, wherein the excitation light is emitted into the first chamber; a second chamber with an inlet, wherein said inlet is separated gas-tight from the first chamber, wherein the excitation light is emitted into the second chamber; a scrubber, wherein the outlet of the first chamber leads to the scrubber, and the sample gas is passed through the scrubber, wherein the scrubber removes the trace gases from the sample gas and background gas remains, wherein the background gas is directed to the inlet of the second chamber; at least one narrow-band measurement light source for emitting measurement light, wherein the measurement light source is arranged such that the measurement light hits the excitation light in the first chamber and the excitation light in the second chamber; a detector unit which is in optical contact with the first and second chambers and detects the measurement light from the first chamber and the measurement light from the second chamber and converts it into a first and a second electrical signal; and a data processing unit which calculates the share of trace gases in the sample gas from the first and second electrical signals.

The object is further achieved by a measuring arrangement for detecting trace gases in a sample gas, the measuring arrangement comprising at least one narrow-band, excitation light source for emitting excitation light; a first chamber with an inlet for the sample gas and an outlet, wherein the excitation light is emitted into the first chamber; a second chamber with an inlet, wherein said inlet is separated gas-tight from the first chamber, wherein the excitation light is emitted into the second chamber; a scrubber, wherein the sample gas is divided after a gas inlet, wherein a part of the sample gas is directed to the inlet of the first chamber and the other part of the sample gas is directed to the scrubber, wherein the scrubber removes the trace gases from the sample gas and background gas remains, wherein the background gas is directed to the inlet of the second chamber; at least one narrow-band measurement light source for emitting measurement light, wherein the measurement light source is arranged such that the measurement light hits the excitation light in the first chamber and the excitation light in the second chamber; a detector unit which is in optical contact with the first and second chambers and detects the measurement light from the first chamber and the measurement light from the second chamber and converts it into a first and a second electrical signal; and a data processing unit which calculates the share of trace gases in the sample gas from the first and second electrical signals.

The claimed measuring arrangements each modify the prior art so that compensation for background noise is possible, and so that compensation for a background spectrum can be realized. For this purpose, the two optical resonators are positioned in two separate chambers. The claimed arrangement produces a photothermal signal, wherein in one chamber, in addition to the absorption of the background gas, the absorption of the target gas contributes to the photothermal signal. The optical resonators in the two chambers experience a resonance shift proportional to the photothermal signal, which is detected via an interrogation laser (measurement light source). The difference between the signals of the interrogation laser proportional to the respective resonance wavelengths provides information about the absorption spectrum of the target gas, and ideally without the influence of the background spectrum.

The advantages of this measurement method are:

A smaller volume (a few mL) compared to the prior art is possible because the optical resonators can be selected to be smaller; in at least one embodiment these are $10\times5\times5$ mm$^3$ large, possibly even smaller.

There is no dead time because the background spectrum is recorded practically simultaneously.

An elimination of the noise of the measurement light source in the background spectrum is possible.

At least one embodiment provides that the measuring arrangement comprises exactly one excitation light source, wherein the excitation light is guided into the first and second chamber via optical components, in particular partially transparent mirrors, lenses, beam splitters, dichroic beam splitters, fiber-based beam splitters or couplers, prisms or the like.

At least one embodiment provides that the detector unit is arranged such that it measures the measurement light in transmission through the first or second chamber.

At least one embodiment provides that the detector unit is arranged such that it measures the measurement light in reflection from the first or second chamber, and an optical component such as a circulator separates the incident and reflected measurement light.

At least one embodiment provides that the excitation light source is designed as a laser, in particular as a diode laser, preferably a continuous wave quantum cascade laser, in particular a continuous wave quantum cascade laser with distributed feedback, or a quantum cascade laser with an external resonator or an interband cascade laser, and/or wherein the measurement light source is designed as a laser, in particular as a diode laser, preferably a monomode diode laser, for example a continuous wave diode laser with distributed feedback.

At least one embodiment provides that the measuring arrangement comprises a modulator which is connected to the excitation light source in order to modulate the wavelength of the excitation light and/or to switch the excitation light source on/off.

At least one embodiment provides that the detector unit is designed as a photodetector, in particular the detector unit comprises two photodetectors: a first photodetector for measurement light in the first chamber and a second photodetector for measurement light in the second chamber.

At least one embodiment provides that the measuring arrangement comprises a lock-in amplifier, in particular as part of the data processing unit which demodulates the measurement light in the first and/or second chamber.

At least one embodiment provides that the excitation light source and the measurement light source are arranged such that the excitation light in the first chamber and the measurement light run parallel in the first chamber, and that the excitation light in the second chamber and the measurement light run parallel in the second chamber.

At least one embodiment provides that the volume of the first and second chamber is between 1 mL and 125 mL, for example between 1 mL and 25 mL or between 1 mL and 5 mL.

At least one embodiment provides that the trace gases are $H_2S$, HF, $SO_2$, $H_2O$, $NH_3$, or HCl.

At least one embodiment provides that the scrubber comprises metal oxide particles with an aerodynamic diameter of less than about 250 nm, in particular less than about 100 nm, wherein the metal oxide particles enter into one or more surface reactions with the sample gas in order to form one or more metal anion complexes on the surfaces of the metal oxide particles, wherein the metal oxide particles are selected from a group that consists of CuO, ZnO, potassium permanganate and alkaline copper carbonate, in particular the metal oxide particles are impregnated in or on carrier particles which are inert to the background gas, wherein the carrier particles have an aerodynamic diameter in a range of about 10 to 250 μm, in particular in a range of 40 to 250 μm.

At least one embodiment provides that the excitation light is absorbed by the background gas and the trace gases in the first chamber and by the background gas in the second chamber, and in each case leads to a temperature and/or refractive index change proportional to the absorption, wherein the refractive index change leads to a phase shift of the measurement light. The temperature change also leads to a phase shift, but only at the modulation frequency of the excitation light source.

At least one embodiment provides that the measuring arrangement is designed as a Fabry-Pérot interferometer with corresponding mirrors as optical resonators in the chambers so that the phase shift of the measurement light is sensitively converted into an intensity change of the transmitted or reflected measurement light.

At least one embodiment provides that the resonances of the resonators are aligned by a temperature control of the resonators via at least one Peltier element, whereby a change in the length of the resonators and a change in the refractive index occurs; a rotation of the resonators; a change in the distance of the mirrors from one another, in particular via a piezo element; and/or a change in the wavelength of the measurement light radiated onto the first chamber and/or the second chamber via an electro-optical modulator.

The object is further achieved by a method for detecting trace gases in a sample gas, comprising the steps of emitting excitation light into a first and second chamber, wherein the second chamber is separated gas-tight from the first chamber; directing sample gas into the first chamber; directing the sample gas from the first chamber to a scrubber, wherein the scrubber removes the trace gases from the sample gas and background gas remains; directing the background gas into the second chamber; emitting measurement light into the first and second chamber; detecting measurement light from the first and second chamber; and determining the share of trace gases using the detected measurement light.

The object is further achieved by a method for detecting trace gases in a sample gas, comprising the steps of emitting excitation light into a first and second chamber, wherein the second chamber is separated gas-tight from the first chamber; directing sample gas into the first chamber; directing the sample gas to a scrubber, wherein the scrubber removes the trace gases from the sample gas and background gas remains; directing the background gas into the second chamber; emitting measurement light into the first and second chamber; detecting measurement light from the first and second chamber; and determining the share of trace gases using the detected measurement light.

BRIEF DESCRIPTION OF THE DRAWINGS

This will be explained in more detail with reference to the following figures.

DETAILED DESCRIPTION

In the figures, the same features are labeled with the same reference signs.

Figure 1:
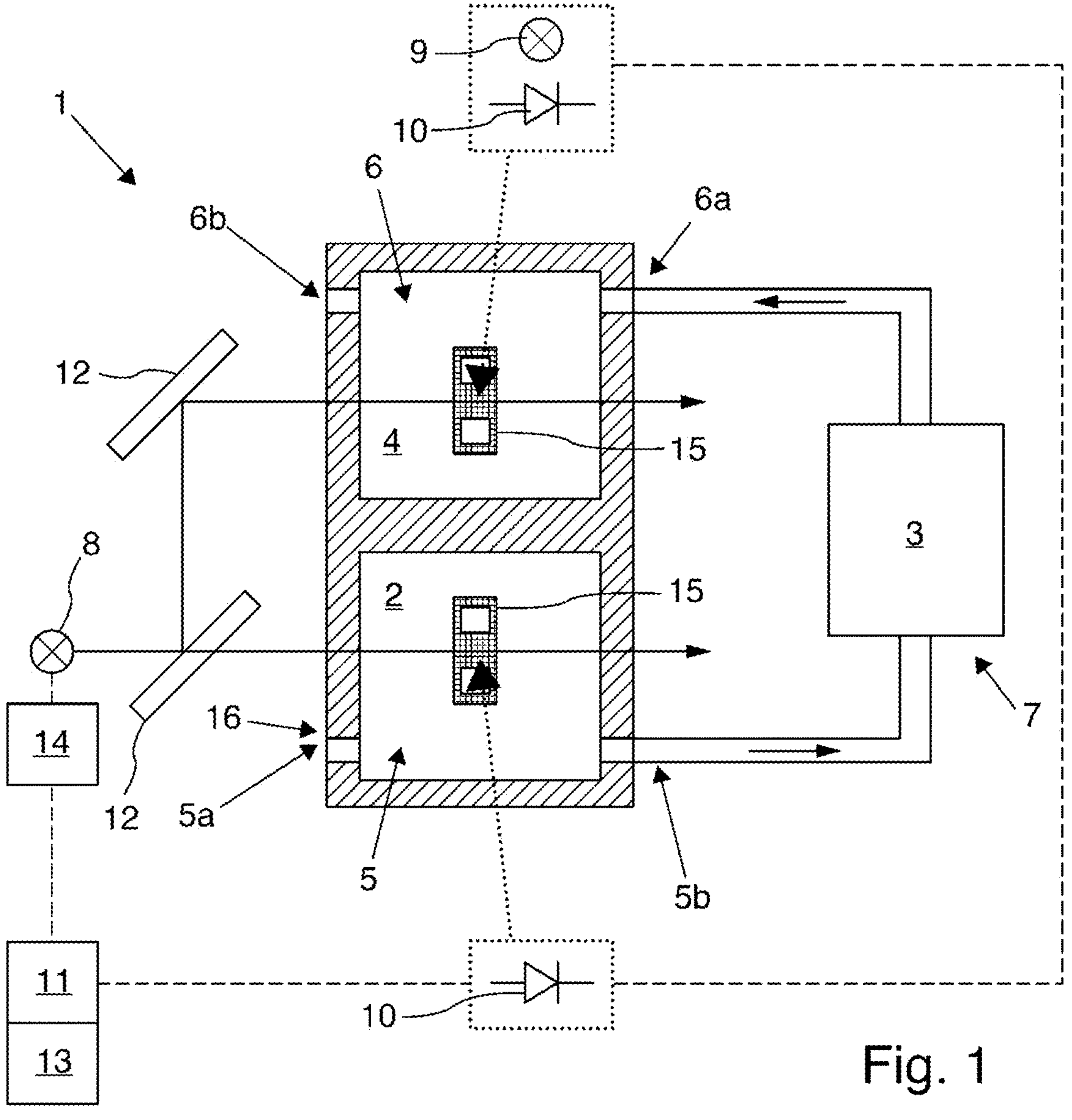
FIG. 1 shows the claimed measuring arrangement.

The claimed measuring system in its entirety has reference sign 1 and is shown in FIG. 1.

The measuring arrangement 1 is a photothermal spectroscopy arrangement. Generally, such arrangements use an excitation light source 8 for sample heating and a measurement light source 9 for monitoring the changes resulting from the heating, usually for detecting refractive index changes. The change in the refractive index causes a phase shift of the light that passes through the heated sample and can be measured with high sensitivity using an interferometer.

For example, a narrow-band excitation light source 8 sends excitation light into a first chamber 5 and a second chamber 6. The excitation light source 1 is designed as a laser, for example as a diode laser, for example a continuous wave quantum cascade laser, for example a continuous wave quantum cascade laser with distributed feedback or a quantum cascade laser with an external resonator or an interband cascade laser. A modulator 14 which modulates the wavelength of the excitation light and/or switches the excitation light source 8 on/off, for example as a modulated voltage source, is connected to the excitation light source 8. The modulator 14 can also be the laser 8 itself or the laser current and accordingly the laser driver.

In the embodiment in FIG. 1, for example, quantum cascade lasers or interband cascade lasers are used due to the high absorptions in the MIR. In the embodiment in FIG. 2 (see below), wavelengths between 980 nm and 1650 nm are useful since a common fiber routing is then possible. The difference between the two embodiments is explained below, especially with regard to the beam guidance of the excitation light from the excitation light source 8.

The sample gas 2 is therefore heated, for example periodically, with modulated excitation light. The modulation may be achieved by wavelength modulation in which the emission frequency of the excitation light source 8 is modulated. Wavelength modulation spectroscopy (WMS) is able to increase the signal-to-noise ratio (SNR) by reducing the noise component of a measurement used for trace detection. In wavelength modulation, the absorption of the excitation light source is converted into a periodic signal which is preferably isolated from its harmonics by a lock-in amplifier 13. This type of detection leads to a significant improvement in the signal-to-noise ratio (SNR) by limiting the detection passband to a narrow frequency interval as well as by shifting the detection to higher frequencies, where the 1/f laser noise is significantly reduced. In general, a lock-in amplifier is an amplifier for measuring a weak alternating electrical signal that is modulated with a reference signal of known frequency and phase. The device represents an extremely narrowband bandpass filter and thereby improves the signal-to-noise ratio (SNR).

One or more excitation light sources 8 can be used; exactly one excitation light source 8 is shown, wherein the excitation light is guided into the first and second chambers 5, 6 via optical components 12, for example via partially transparent mirrors, lenses, beam splitters, dichroic beam splitters, fiber-based beam splitters or couplers, prisms or the like.

Measuring gas 2 is fed into the first chamber 5 via the inlet 5*a*. The sample gas 2 is led to a scrubber 7 via its outlet 5*b*. The scrubber 7 removes the trace gases 3 from the sample gas 2, and background gas 4 remains. Trace gases 3 are for example $H_2S$, HF, $SO_2$, $H_2O$, $NH_3$ or HCl.

The volume of the first chamber 5 is, for example, between 1 mL and 125 mL or between 1 mL and 25 mL or between 1 mL and 5 mL.

The scrubber 7 comprises, for example, metal oxide particles having an aerodynamic diameter of less than about 250 nm, for example, less than about 100 nm, wherein the metal oxide particles enter into one or more surface reactions with the sample gas in order to form one or more metal-anion complexes on the surfaces of the metal oxide particles. The metal oxide particles can be selected from a group that consists of CuO, ZnO, potassium permanganate and alkaline copper carbonate ($CuCO_3 \cdot C(OH)_2$). The metal oxide particles can be impregnated in or on carrier particles which are inert to the background gas 4, wherein the carrier particles have an aerodynamic diameter in a range of about 10 to 250 μm, for example, in a range of 40 to 250 μm.

The background gas 4 is led after the scrubber 7 to the inlet 6*a* of the second chamber 6. The second chamber 6 comprises an outlet 6*b*, through which the gas can be discharged and discarded.

The volume of the second chamber 6 is, for example, between 1 mL and 125 mL or between 1 mL and 25 mL or between 1 mL and 5 mL.

The measuring arrangement 1 generally comprises one narrow-band measurement light source 9 for emitting measurement light. This is arranged in such a way that the measurement light hits the excitation light in the first chamber 5 and the excitation light in the second chamber 6. In FIG. 1, excitation light is sent “from left to right”. The measurement light shines "into the plane of the paper", i.e., from top to bottom. This is symbolically represented by the light source 9 framed with dots or detector units 10 and the dotted arrow in FIG. 1 which indicates approximately where the two components are arranged.

The measurement light source 9 is designed as a laser, for example as a diode laser, for example a single-mode diode laser, for example a continuous wave diode laser with distributed feedback. For example, the laser 9 has a wavelength of 1550 nm or 1310 nm.

The measuring arrangement 1 is designed as a Fabry-Pérot interferometer. The Fabry-Pérot interferometer consists of two partially reflecting mirrors 15 of high reflectivity at the "lower" and "upper" ends of the chambers 5, 6 which together form an optical resonator. The mirrors of the resonators are typically made of quartz glass. Each chamber 5, 6 therefore has two mirrors 15, but only the "lower" mirror is shown in FIG. 1. The transmission spectrum of this arrangement shows narrow transmission maxima for wavelengths that satisfy the resonance condition, while other spectral regions are almost completely extinguished in the transmission. This happens through constructive or destructive interference of the partial beams. In one embodiment, the dimensions of the chambers 5, 6 are adapted to the wavelength of the laser 9.

There are further embodiments to align the resonances of the two resonators: in one embodiment, the temperature of the resonators is controlled via a Peltier element, which results in a change in the length of the resonators and, above all, a change in the refractive index. In one embodiment, the resonators are rotated (angle tuning). In one embodiment, the distance between the mirrors is changed (e.g., via a piezo element). In one embodiment, the wavelength of one of the two beams is changed via an EOM (electro-optical modulator).

The arrangement 1 further comprises a detector unit 10 which detects the measurement light in the first chamber 5 and the measurement light in the second chamber 6 and converts it into a first and a second electrical signal. The detector unit 10 is shown similarly to the light source 9. The detector unit 10 therefore also measures "into the page".

The detector unit 10 is designed as a photodetector. Shown here are two photodetectors 10, a first photodetector 10 for measurement light in the first chamber 5 and a second photodetector 10 for measurement light in the second chamber 6.

Changes in the refractive index can be determined by measuring the intensity of the measurement light, which depends on the phase shift of the measurement light. As mentioned above, the wavelength of the excitation light is modulated by the modulator 14. The photodetector 10 is arranged such that it detects a modulation of the measurement light while passing through the chambers 5, 6.

The measuring arrangement 1 comprises, for example as part of the data processing unit 11, a lock-in amplifier 13 which receives an alternating current component of the electrical signal of the received measurement light generated by the photodetector 10. The current of the detector 10 is converted into a voltage signal which is then directed to the lock-in amplifier 13. Thus, a harmonic of the modulation of the measurement light passed through the chambers 5, 6 can be determined. The detector 10 also receives a direct current component. The DC signal can be used to maintain the emission frequency of the measurement light source 9 at a predetermined value, substantially at the inflection point, of the transfer function of the Fabry-Pérot interferometer.

As an alternative to controlling via the direct current component, the measurement light can be modulated (typically with a frequency above the modulation frequency of the excitation laser 8) so that the lock-in amplifier 14 generates an error signal via the Nth harmonic that resembles the Nth derivative of the transmission or reflection of the resonator. This allows controlling to the inflection point of the transmission function (or reflection function, see below). Without such modulation, there is controlling to a fixed transmission or reflection value. This has the disadvantage that when the laser intensity is changed, it is no longer controlled to the inflection point, but slightly above or below.

The sample gas (comprising the background gas 4 and the trace gases 3) is located in the first chamber 5 due to the above-described gas flow from the first chamber 5 via the scrubber 7 to the second chamber. Only the background gas 4 is located in the second chamber 6. The excitation light is radiated into both chambers 5, 6. This creates a photothermal signal, wherein in the first chamber 5, in addition to the absorption of the background gas 4, the absorption of the target gas 3 contributes to the photothermal signal.

The measuring arrangement 1 comprises a data processing unit 11 which calculates the share of trace gases 3 in the sample gas 2 from the first and second electrical signals. For example, one signal is subtracted from the other, for example in the data processing unit 11.

Figure 2:
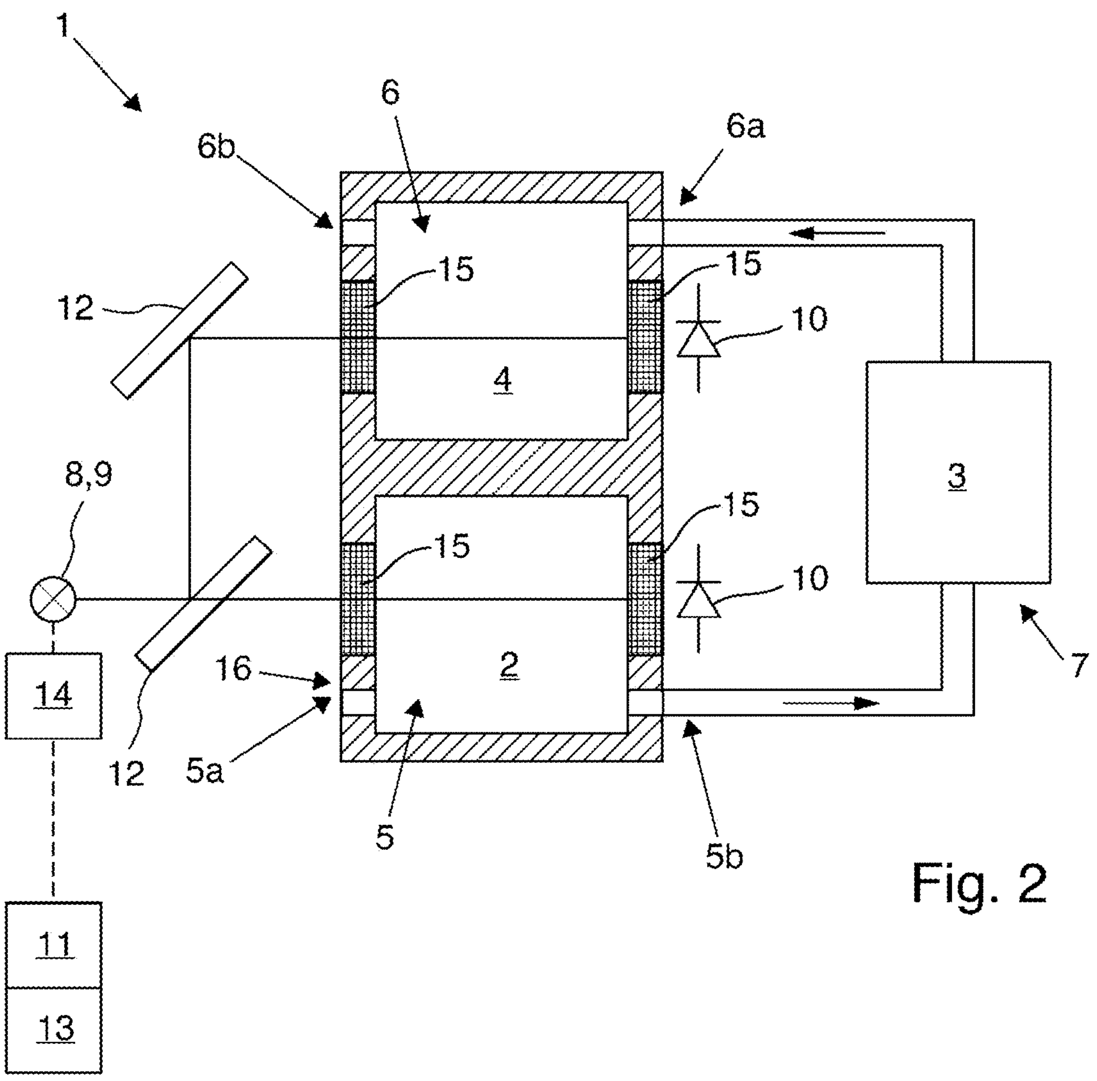
FIG. 2 shows the claimed measuring arrangement in one embodiment.

FIG. 2 shows one embodiment.

In FIG. 2, the excitation light source 8 and the measurement light source 9 are arranged such that the excitation light in the first chamber 5 and the measurement light in the first chamber 5 run parallel, and that the excitation light in the second chamber 6 and the measurement light in the second chamber 6 run parallel. In contrast to FIG. 1, the excitation light and the measurement light run "from left to right" in this case. For reasons of space, only one light source is drawn in FIG. 2 (reference signs "8, 9"), although two are used. The beam path of the excitation and measurement light is the same. In one embodiment, the mirrors 15 generate the resonators for the Fabry-Pérot interferometer. The resonators can be adjusted as described above.

Figure 3:
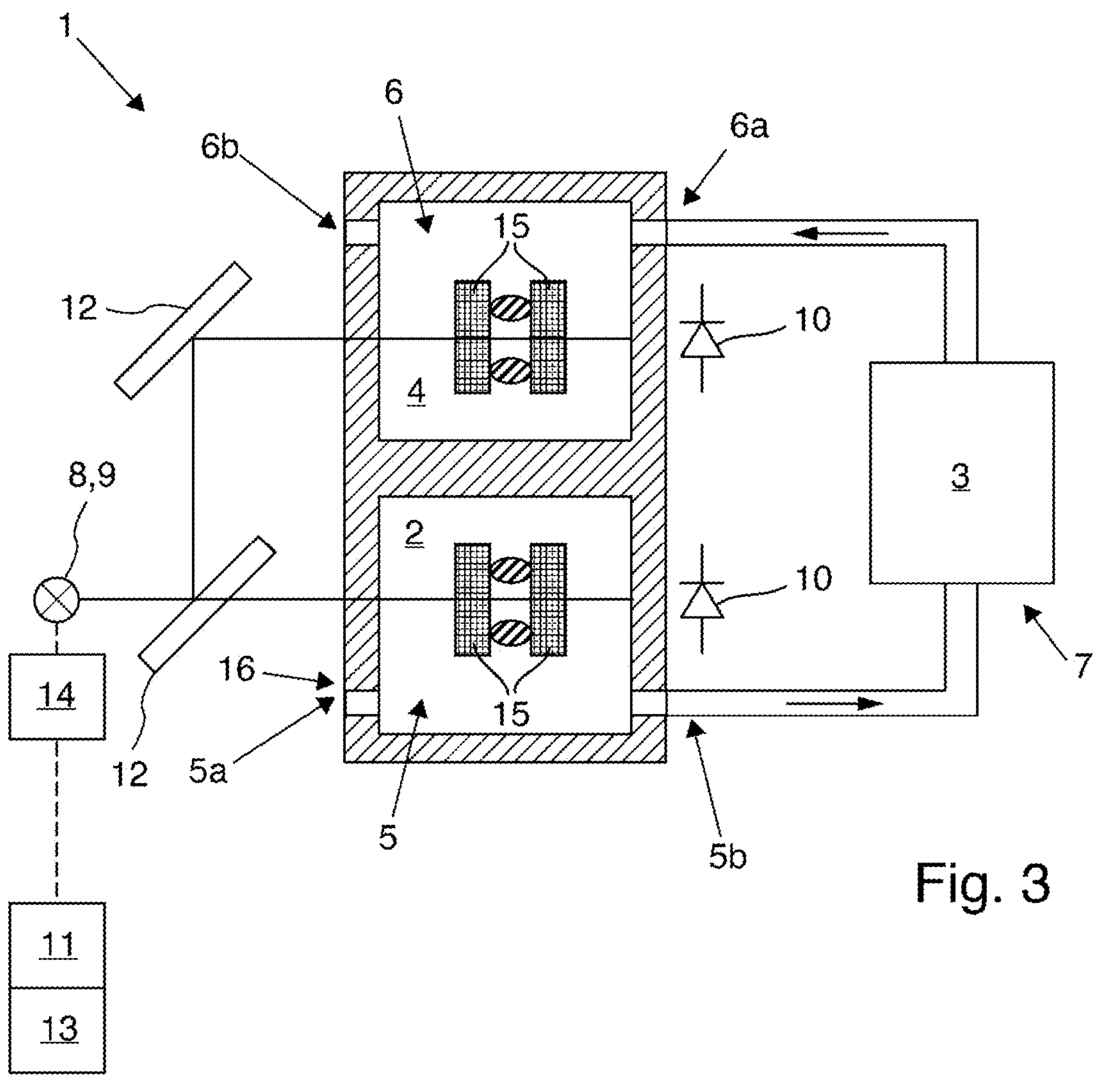
FIG. 3 shows the claimed measuring arrangement in one embodiment.

FIG. 3 shows the claimed measuring arrangement 1 in an embodiment and is similar to FIG. 2. In FIG. 3, the resonators (two mirrors 15 with spacers) are placed in the cells 5, 6. The spacer can be made of quartz glass, which can result in relatively large expansion with temperature, or the spacer can alternatively consist of a temperature-stable material, such as Zerodur. The cell must then be large enough to accommodate a resonator with a holder. The resonator is then adjusted to the corresponding wavelengths as above. In one embodiment, this is done thermally. The tuning range of the laser must be larger than the distance between two resonances, in particular due to the temperature. This allows the wavelength of the laser to be adapted to the resonator.

In the embodiments described in FIGS. 1 to 3, the measurement is carried out in transmission. With little modification, measurement in reflection is possible. The measurement light reflected from the resonator is then used for control (DC) and measurement (AC). To this end, a circulator for example is used to separate the incident and reflected light.

The acoustic design of the measuring arrangement 1 is such that external acoustic disturbances act on the chambers 5, 6 in the same way so that acoustic disturbances are eliminated by differential measurement. This can be done, for example, by using a common base plate for the chambers 5, 6 or their rigid connection, by acoustic filters, for example in the gas supply lines, or by placing the two chambers 5, 6 close to each other.

Figure 4:
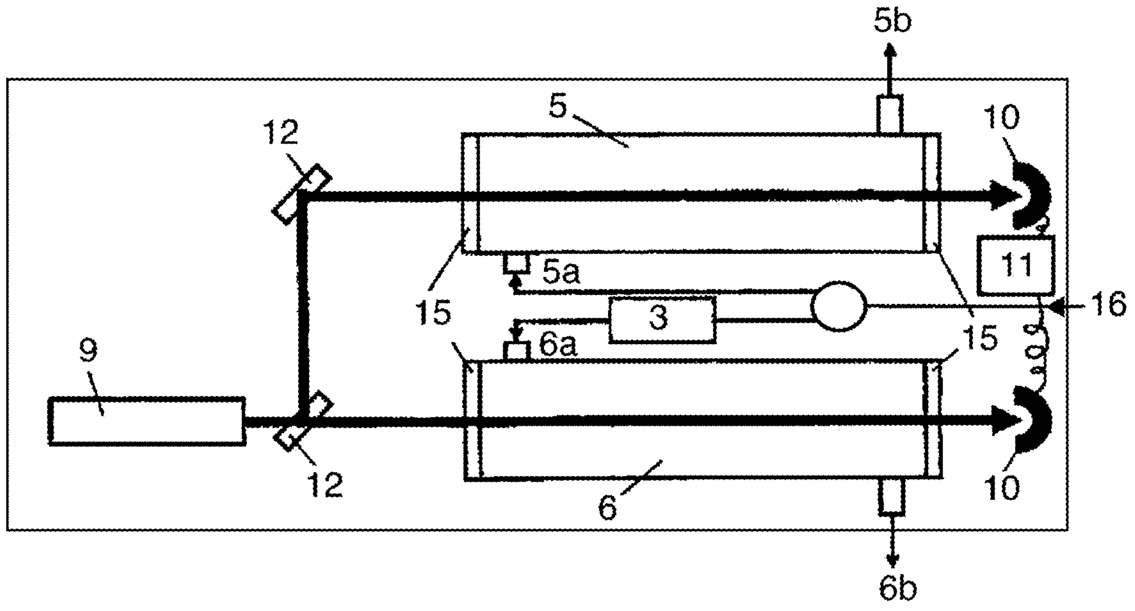
FIG. 4 shows the claimed measuring arrangement in one embodiment.

FIGS. 1 to 3 show a "series connection" of the two chambers 5, 6 for the gas flow. FIG. 4 shows a "parallel circuit". The gas enters the measuring arrangement 1 at reference sign 16. The gas flow is then split into two lines. One of the lines is connected directly to inlet 5*a*. The other line is led to inlet 6*a* via a scrubber 3. The excitation light source 8 is not shown here. The above-mentioned embodiments, for example with regard to the resonators, apply analogously. Data processing also takes place in a similar manner.

We claim:

1. A measuring arrangement for detecting trace gases in a sample gas, the measuring arrangement comprising:
- at least one narrow-band excitation light source for emitting excitation light;
- a first chamber with an inlet for the sample gas and an outlet, wherein the excitation light is emitted into the first chamber;
- a second chamber with an inlet, wherein it is separated gas-tight from the first chamber, wherein the excitation light is emitted into the second chamber;
- a scrubber, wherein the outlet of the first chamber leads to the scrubber and the sample gas is passed through the scrubber,
- wherein the scrubber removes the trace gases from the sample gas and background gas remains,
  - wherein the background gas is directed to the inlet of the second chamber;
- at least one narrow-band measurement light source for emitting measurement light, wherein the measurement light source is arranged such that a measurement light hits the excitation light in the first chamber and the excitation light in the second chamber;
- a detector unit which is in optical contact with the first and second chambers and detects the measurement light from the first chamber and the measurement light from the second chamber and converts it into a first and a second electrical signal; and
- a data processing unit which calculates an amount of trace gases in the sample gas from the first and second electrical signals.

2. The measuring arrangement according to claim 1, wherein the detector unit is arranged such that it measures the measurement light in transmission through the first or second chamber.

3. The measuring arrangement according to claim 1, wherein the detector unit is arranged such that it measures the measurement light in reflection from the first or second chamber, and an optical component such as a circulator separates an incident and a reflected measurement light.

4. The measuring arrangement according to claim 1, comprising a modulator which is connected to the at least one excitation light source to modulate a wavelength of the excitation light and/or to switch the at least one excitation light source on or off.

5. The measuring arrangement according to claim 1, further comprising a lock-in amplifier as part of the data processing unit, which demodulates the measurement light in the first and/or second chamber.

6. The measuring arrangement according to claim 1, wherein the at least one excitation light source and the at least one measurement light source are arranged such that the excitation light in the first chamber and the measurement light in the first chamber run parallel, and that the excitation light in the second chamber and the measurement light in the second chamber run parallel.

7. The measuring arrangement according to claim 1, wherein the volume of the first and second chambers is between 1 mL and 125 mL.

8. The measuring arrangement according to claim 1, wherein the scrubber comprises metal oxide particles with aerodynamic diameters of less than about 250 nm,
- wherein the metal oxide particles undergo one or more surface reactions with the sample gas to form one or more metal-anion complexes on the surfaces of the metal oxide particles,
- wherein the metal oxide particles are selected from a group that consists of CuO, ZnO, potassium permanganate, and alkaline copper carbonate,
- wherein, the metal oxide particles are impregnated in or on carrier particles which are inert to the background gas,
- wherein the carrier particles have an aerodynamic diameter in a range of about 10 to 250 μm.

9. The measuring arrangement according to claim 8, wherein the carrier particles have aerodynamic diameters in a range of 40 to 250 μm.

10. The measuring arrangement according to claim 8, wherein the metal oxide nanoparticles have an aerodynamic diameter of less than 100 nm.

11. The measuring arrangement according to claim 1, wherein the excitation light is absorbed by the background gas and the trace gases in the first chamber and by the background gas in the second chamber, and in each case leads to a temperature and/or refractive index change proportional to the absorption, wherein the refractive index change leads to a phase shift of the measurement light.

12. The measuring arrangement according to claim 11, wherein the measuring arrangement is designed as a Fabry-Pérot interferometer with corresponding mirrors as optical resonators in the first and second chambers so that the phase shift of the measurement light is sensitively converted into an intensity change of a transmitted or reflected measurement light.

13. The measuring arrangement according to claim 12, wherein resonances of the resonators are aligned by:
- temperature control of the resonators via at least one Peltier element, whereby a change in a length of the resonators and a change in refractive index occurs;
- a rotation of the resonators;
- a change in a distance between the resonators via a piezo element; and/or
- a change in a wavelength of the measurement light radiated onto the first chamber and/or the second chamber via an electro-optical modulator.

14. The measuring arrangement according to claim 1, wherein the volume of the first and second chambers is between 1 mL and 5 mL.

15. A measuring arrangement for detecting trace gases in a sample gas, the measuring arrangement comprising:
- at least one narrow-band excitation light source for emitting excitation light;
- a first chamber with an inlet for the sample gas and an outlet, wherein the excitation light is emitted into the first chamber;
- a second chamber with an inlet, wherein it is separated gas-tight from the first chamber, wherein the excitation light is emitted into the second chamber;
- a scrubber, wherein the sample gas is divided after a gas inlet, wherein a part of the sample gas is directed to the inlet of the first chamber and the other part of the sample gas is directed to the scrubber, wherein the scrubber removes trace gases from the sample gas and background gas remains, wherein the background gas is directed to the inlet of the second chamber;

at least one narrow-band measuring light source for emitting measuring light, wherein the at least one measuring light source is arranged such that the measuring light hits the excitation light in the first chamber and the excitation light in the second chamber;

a detector unit which is in optical contact with the first and second chambers and detects the measurement light in the first chamber and the measurement light in the second chamber respectively and converts it into a first and a second electrical signal; and a data processing unit which calculates an amount of trace gases in the sample gas from the first and second electrical signals.

16. A method for detecting trace gases in a sample gas, comprising the steps of:

emitting excitation light into a first and second chamber, wherein the second chamber is separated gas-tight from the first chamber;

directing sample gas into the first chamber;

directing the sample gas from the first chamber to a scrubber, wherein the scrubber removes trace gases from the sample gas and background gas remains;

directing the background gas into the second chamber;

emitting measurement light into the first and second chambers;

detecting measurement light from the first and second chamber; and determining an amount of trace gases using the detected measurement light.

17. A method for detecting trace gases in a sample gas, comprising the steps of:

emitting excitation light into a first and second chamber, wherein the second chamber is separated gas-tight from the first chamber;

directing sample gas into the first chamber;

directing the sample gas to a scrubber, wherein the scrubber removes trace gases from the sample gas and background gas remains;

directing the background gas into the second chamber;

emitting measurement light into the first and second chambers;

detecting measurement light from the first and second chamber; and determining the amount of trace gases using the detected measurement light.

* * * * *